(12) United States Patent
Chen et al.

(10) Patent No.: US 7,720,883 B2
(45) Date of Patent: May 18, 2010

(54) KEY PROFILE COMPUTATION AND DATA PATTERN PROFILE COMPUTATION

(75) Inventors: Zhimin Chen, Redmond, WA (US);
Venkatesh Ganti, Redmond, WA (US);
Gunjan Jha, Redmond, WA (US);
Shriraghav Kaushik, Redmond, WA (US); Vivek Narasayya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 11/769,050

(22) Filed: Jun. 27, 2007

(65) Prior Publication Data

US 2009/0006392 A1 Jan. 1, 2009

(51) Int. Cl.
*G06F 7/00* (2006.01)
*G06F 17/30* (2006.01)
(52) U.S. Cl. .................................................... 707/803
(58) Field of Classification Search ........................ None
See application file for complete search history.

(56) References Cited

U.S. PATENT DOCUMENTS

| | | | |
|---|---|---|---|
| 6,708,163 B1 | 3/2004 | Kargupta et al. | |
| 6,993,534 B2 | 1/2006 | Denesuk et al. | |
| 7,043,476 B2 | 5/2006 | Robson | |
| 7,181,437 B2 * | 2/2007 | Indeck et al. | 707/1 |
| 2003/0212675 A1 | 11/2003 | Denesuk et al. | |
| 2004/0139070 A1 | 7/2004 | Dysart et al. | |
| 2005/0108256 A1 | 5/2005 | Wakefield et al. | |
| 2005/0273706 A1 | 12/2005 | Manber et al. | |
| 2006/0167873 A1 * | 7/2006 | Degenaro et al. | 707/6 |
| 2006/0242180 A1 | 10/2006 | Graf et al. | |
| 2007/0005596 A1 | 1/2007 | Brown et al. | |
| 2007/0011224 A1 | 1/2007 | Mena | |
| 2007/0013968 A1 * | 1/2007 | Ebaugh et al. | 358/448 |
| 2008/0114725 A1 * | 5/2008 | Indeck et al. | 707/2 |

OTHER PUBLICATIONS

Hunor Albert-Lorincz et al, Lorincz et al. "Mining frequent sequential patterns under regular expressions: a highly adaptative strategy for pushing constraints", Proc The Third SIAM International Conference on Data Mining SDM'03, 5 pages.*
Fiolet, et al., "Distributed Data Mining", at <<http://scholar.google.com/scholar?hl=en&lr=&q=cache:8aRBgv-90eYJ:www.pdcp.org/vols/vol06/SCPE_6_1_08.pdf+++computation+of++data+profiling+%2B+database+%2B+pattern+%2B+key+%2B++mining>>, Scalable Computing: Practice and Experience, vol. 6, No. 1, 2005, pp. 1-13.
Ramesh, et al., "Indexing and Data Access Methods for Database Mining", at <<http://www.cs.albany.edu/~maniatty/publications/tr-01-01.pdf>>, Jun. 2001, pp. 0-17.
Chen, et al., "Efficient Computation of Multiple Group By Queries", ACM Press, 2005, pp. 263-274.

* cited by examiner

*Primary Examiner*—Uyen T. Le

(57) ABSTRACT

Architecture that provides a data profile computation technique which employs key profile computation and data pattern profile computation. Key profile computation in a data table includes both exact keys as well as approximate keys, and is based on key strengths. A key strength of 100% is an exact key, and any other percentage in an approximate key. The key strength is estimated based on the number of table rows that have duplicated attribute values. Only column sets that exceed a threshold value are returned. Pattern profiling identifies a small set of regular expression patterns which best describe the patterns within a given set of attribute values. Pattern profiling includes three phases: a first phases for determining token regular expressions, a second phase for determining candidate regular expressions, and a third phase for identifying the best regular expressions of the candidates that match the attribute values.

20 Claims, 12 Drawing Sheets

KEY PROFILE COMPUTATION AND DATA PATTERN PROFILE COMPUTATION

BACKGROUND

Data integration and data cleaning applications need analytical tools to understand the characteristics of the contents and also the structure among columns of the data. Such analysis is critical before a cleaning query or a data exchange query can be designed for the data. Indeed, many data exchange tools often assume and exploit the existence of constraints that hold for the data being integrated. Unfortunately, traditional data analysis tools fall short for tasks that explore the contents and structure of the data such as the task of finding all columns with a large fraction of null values or all (almost) key columns in a given relation. In general, data quality metrics are hard to define because data quality can be domain/application specific.

One well known approach to defining data quality is using data profiling. A data profile is a collection of elements each of which is an aggregate statistics of the data, such as number of rows in the Customer table, number of distinct values in the State column, number of NULL or missing values in the Zip column, distribution of values of the City column, whether or not "name, address" is a key, etc. Indeed, there are several tools already available that allow profiling a data source, but while such tools are already useful, fall short in many ways. For example, the tools do not provide efficient and scalable key discovery for tables and fail in the ability to extract pattern profiles from the data.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a data profile computation technique that employs key profile computation and data pattern profile computation. Key profile computation in a data table includes both exact keys as well as approximate keys, and is based on key strengths. A key strength of 100% is an exact key, and any other percentage is an approximate key. The key strength is estimated based on the number of table rows that have duplicated attribute values. At the end of the process only column sets that exceed a threshold value are returned.

Pattern profiling identifies data patterns within attribute values, expressed as regular expressions over input character classes. Pattern profiling identifies a small set of regular expression patterns which best describe the patterns within a given set of attribute values. Pattern profiling includes three phases: a first phases for determining token regular expressions, a second phase for determining candidate regular expressions, and a third phase for identifying the best regular expressions of the candidates that match the attribute values.

Data analysis and exploration can also include the discovery of approximate functional dependencies, approximate value inclusions, and frequent values.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
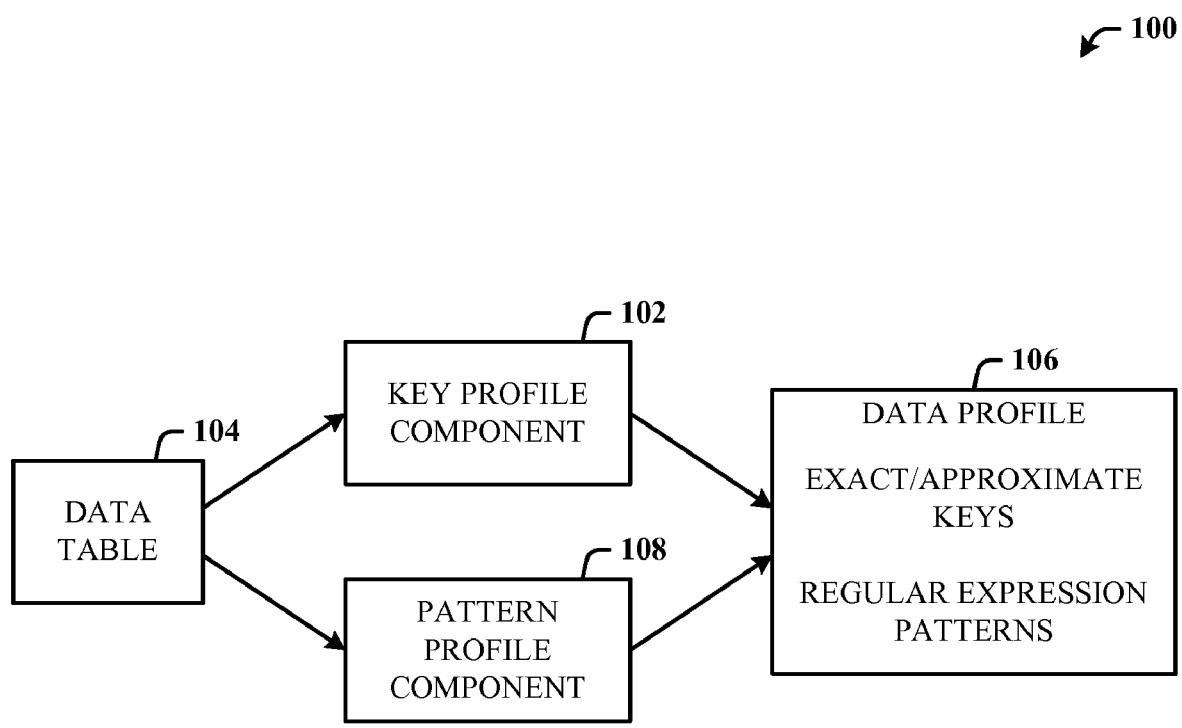
FIG. 1 illustrates a computer-implemented data profiling system.

The disclosed architecture provides a technique for data profile computation based on key profiles and data pattern profiling. Exact table keys are considered as well as approximate keys. Approximate keys are discovered that have a key strength above a predetermined threshold percentage. Pattern profiles are also analyzed by identifying a small set of regular expression patterns that best describe patterns within a given input set of attribute values.

Keys are columns that determine other columns, so that any two records must differ on at least one of the key columns. Identification of composite keys is a critical task involved in data integration. For example, the fact that customer name and address together constitutes a key can be used to match an input feed of customers with an existing database of customers to check whether a given customer already exists. This information can be used to import only those customers that do not already exist.

In addition to exact keys as defined above, approximate keys also play an important role in understanding the data quality. Thus, for example, customer names and addresses may not be an exact key, but if suppressing null values, then the customer names and addresses may be an exact key. Such information can be used to treat null values separately, for instance. The key strength of a set of columns is defined to be the number of distinct values in the column as a fraction of the number of rows in the table. A key strength of 100% indicates an exact key since the number of distinct values equals the number of rows. Intuitively, a higher key strength for a given column set means that this column set is closer to being an exact key.

One of the aspects of data profiling that is different from traditional database statistics is the task of discovering keys, both exact and approximate. For example, interest may be in all 3-column keys of a table where the key strength is above 95%. Suppose that a table has twenty columns. One way to address this task is to consider all 3-column combinations, compute the key strength of each combination and filter those where the strength is above 95%. However, the number of 3-column combinations is large—for twenty columns, the number of combinations is 1140, and for each column combination the table needs to be scanned to determine the key strength. Since table sizes are typically much larger, scanning a table this many times easily becomes prohibitively expensive. Thus, at least insofar as data profile computation is concerned, more efficient algorithms for discovering approximate keys are desired.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented data profiling system 100. The system 100 includes a key profile component 102 for computing a key strength value of a data table 104 as part of a data profile 106. Additionally, the system 100 can include a pattern profile component 108 for identifying regular expression patterns in the data table 104 as part of the data profile 106.

The key profile component 102 include the methods for computing exact and approximate keys, key strengths, and thresholds, for example, which will be described below. The pattern profile component 108 includes the algorithms and inputs for generating expression patterns which will be described below.

Figure 2:
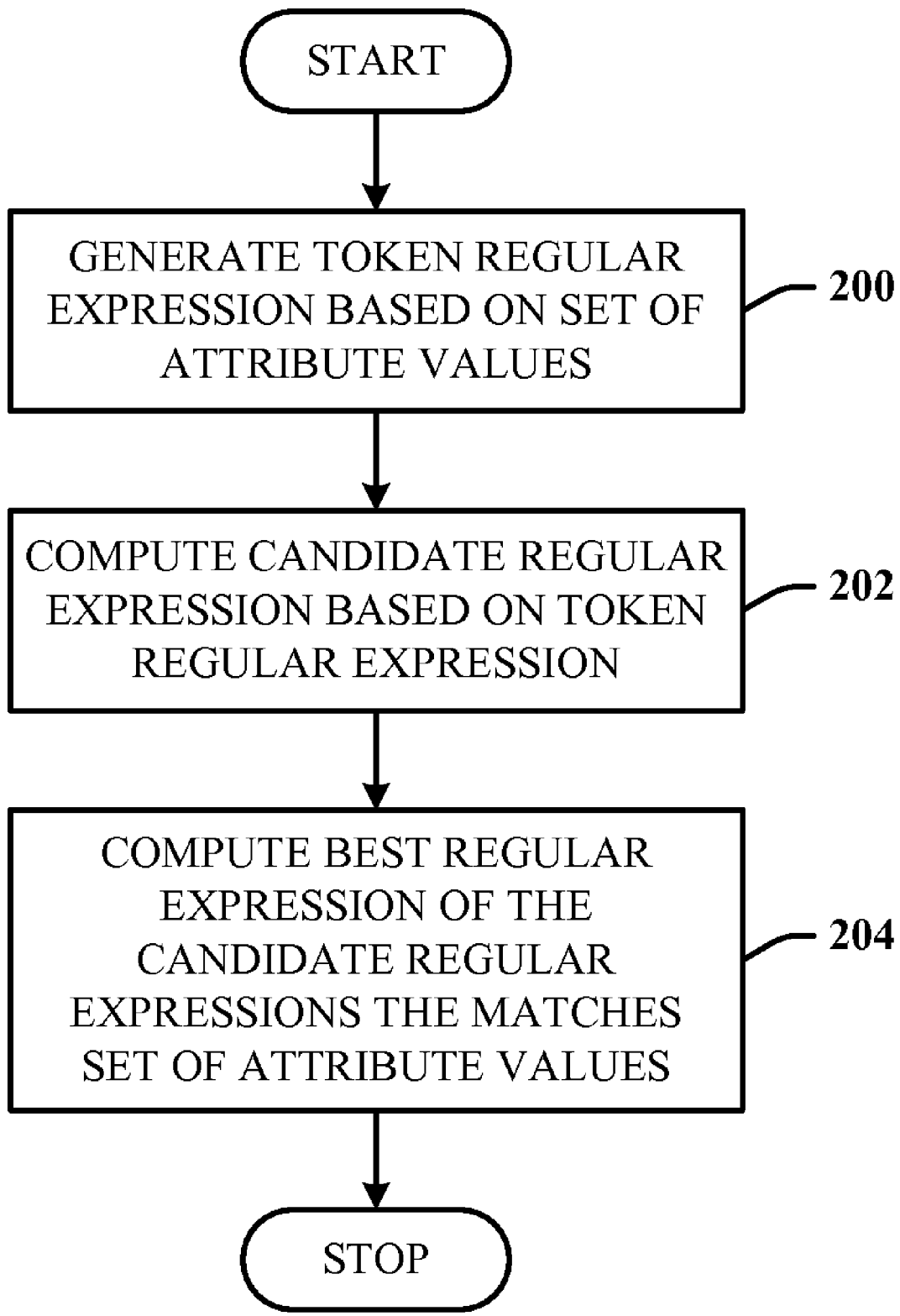
FIG. 2 illustrates a method of computing a data profile.

FIG. 2 illustrates a method of computing a data profile. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 200, a token regular expression is generated based on set of attribute values. At 202, candidate regular expressions are computed based on the token regular expression. At 204, a best regular expression of the candidate regular expressions is computed that matches the set of attribute values.

Figure 3:
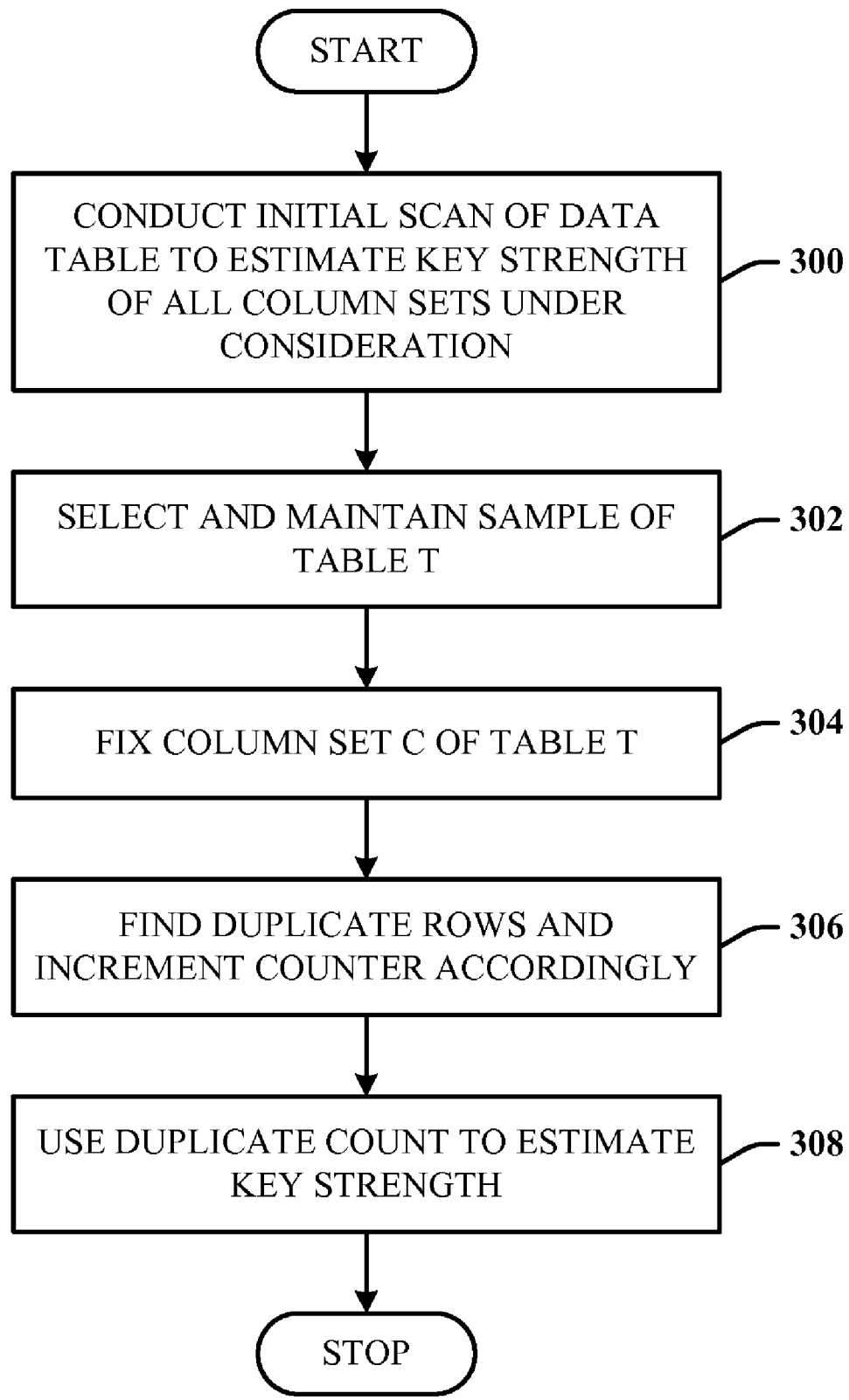
FIG. 3 illustrates a method of discovering approximate keys in a data table.

FIG. 3 illustrates a method of discovering approximate keys in a data table. At 300, an initial scan of the (e.g., table T) is conducted to estimate the key strength of all column sets under consideration. This can be accomplished by counting the duplicate rows in table T. At 302, a sample of table T is then selected and maintained. At 304, a column set C of the sample table T is then fixed. At 306, duplicate rows are then found in the column set and a duplicate counter incremented. In other words, for each new row t, if the values in columns C (t[C]) are already present in a row of the sample, then this row is counted as a duplicate and a duplicate count (e.g., duplicateCount) is incremented for the column set C. The duplicate count is used to estimate the key strength.

Figure 4:
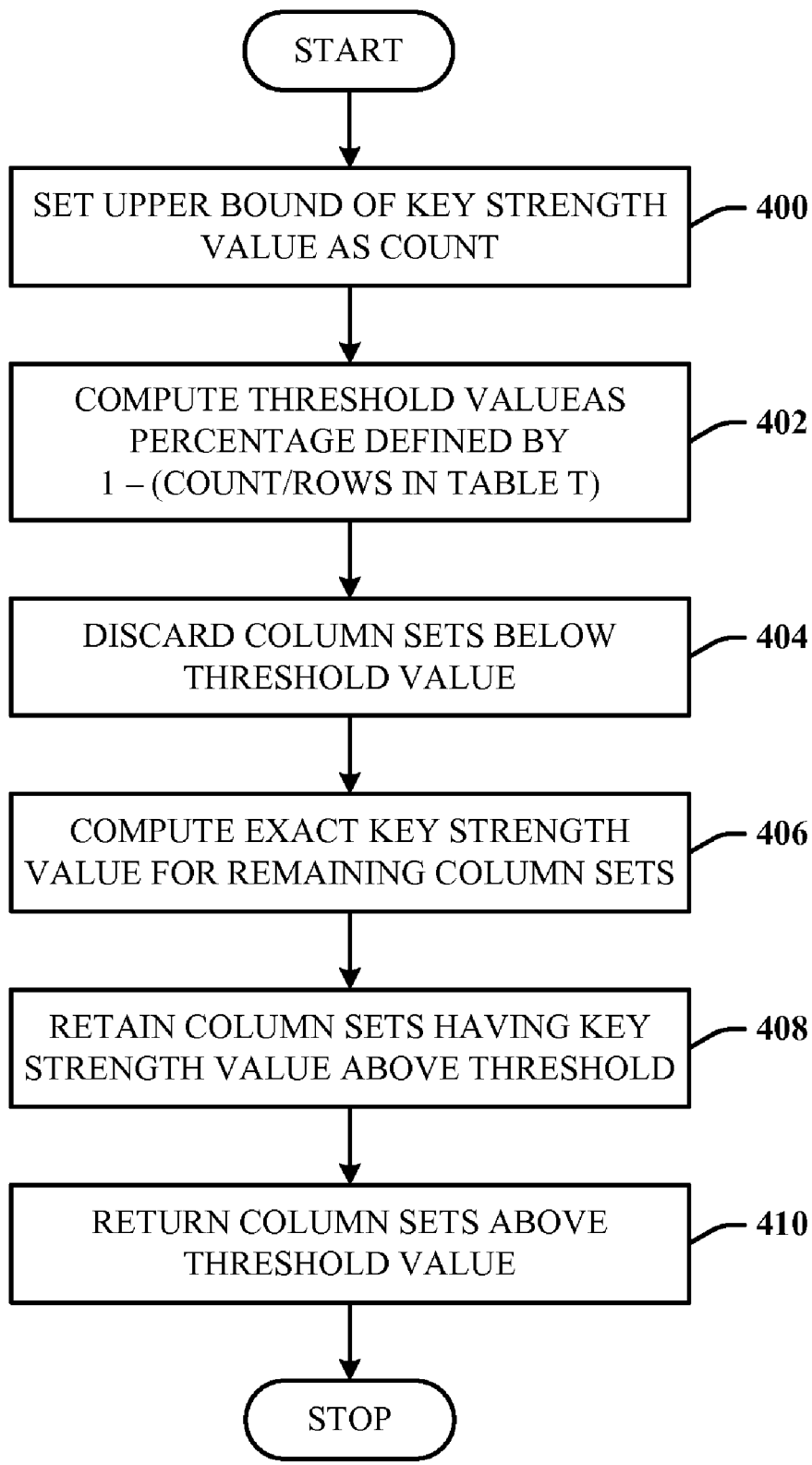
FIG. 4 illustrates a method of bounding the key strength value on one side based on a row duplicate count.

FIG. 4 illustrates a method of bounding the key strength value on one side based on a row duplicate count. The duplicate row count can be used to bound the key strength value from one side. Since every increment of the duplicate count is correct, an upper bound on the key strength is then obtained, as indicated at 400. At 402, a threshold percentage is computed as the number of rows in the table T minus the corresponding duplicate count divided by the number of rows in table T. Thus, for a column set C for which the associated key strength is above threshold P (e.g., a percentage P) this estimate is guaranteed to be above P %. On the other hand, for many data distributions, for column sets where the key strength is below P %, it can be expected that the estimate will be below P %. Thus, of column sets can be pruned and the exact key strength computed only for a smaller collection of column sets. Accordingly, at 404, column set having an estimate below the threshold are discarded. At 406, the exact key strength value is computed for the remaining column sets. At 408, column sets with key strength values above the threshold are retained. At 410, the retained column sets are then returned. The algorithm is listed as follows. The input to the algorithm is a table T and the task is to find all k-column sets that have key strength above P %.

Algorithm DiscoverKeys
Input: Table T, Percentage P, Space budget B, column set size k
1. Open a scan on table T
2. Initialize a reservoir sample (with replacement) of T up to size permitted by B
3. For each column set of size up to k
    a. Set duplicateCount=0
4. For each tuple t in T
    a. For each column set C of size up to k
        i. If t[C] is present in some row of the sample, increment the corresponding duplicateCount
    b. Maintain the reservoir sample
5. For each column set of size up to k
    a. Estimate the key strength as (the number of rows in T minus the respective duplicateCount) divided by the number of rows in T
    b. Throw out those that are below percentage P.
6. For each of the remaining column sets
    a. Compute the exact key strength by scanning T
    b. Retain only those with key strength above P %
7. Return the column sets thus discovered Pattern Profiling A goal of pattern profiling is to identify the patterns, expressed as regular expressions over input character classes, within attribute values. For example, phone numbers usually follow patterns such as (ddd)-ddd-dddd or 1-ddd-ddddddd. Identifying such patterns enables validating attribute values within a column, and then correcting and standardizing a number of ill-formatted and incorrect attribute values, thereby improving the overall data quality.

The disclosed pattern profiling component 108 of FIG. 1 achieves the above goal and identifies a small set of regular expression patterns which "best" describe the patterns within a given set of attribute values. Given an attribute A of a relation R and a regular expression r, the quality of r in describing values in R[A] is a combination of two factors: (i) the percentage of attribute values r matches, and (ii) the percentage of values that do not belong to R[A] which are matched by r.

For example, consider the phone number column where all values which consist of letters are incorrect, and cannot ever be in the phone number attribute. Therefore, any regular expression which matches values containing letters has to be penalized. Otherwise, the regular expression ".*" would match 100% of all attribute values and can be considered the best. However, it also accepts all values that cannot (semantically) belong to the given attribute.

In order to formalize the above notion of penalizing acceptance of values that do not belong to an attribute, a conventional minimum description length (MDL) is adopted. Informally, the minimum description length principle favors a model (e.g., of regular expressions) which has the smallest encoding length to describe a set of attribute values.

With respect to standard value tables for describing regular expressions, typically, regular expressions are only written in terms of character classes. However, it is beneficial to allow regular expressions to also contain standard values. For example, if regular expressions capturing the state values are allowed to refer to a standard table US.State of state abbreviations in the United States, then a regular expression [US.State], can be specified which is accurate and concise. Tables containing such standardized values are referred to as standard value tables. The pattern profiling problem will now be defined after introducing some notation.

Let S denote the set of attribute values from R[A].

DL(r, S) is the encoding length for describing all strings in S using the regular expression r as the model. DL($\{r_1, \ldots, r_K\}$, S) is the encoding length for describing all strings in S using the set of regular expressions $\{r_1, \ldots, r_K\}$.

The pattern profiling problem can be defined as follows: Given a set S of attribute values, a tokenizing function t, a set of standard value tables, values f and F (f<F) between 0 and 1, determine the set of regular expressions each of which matches at least f|S| attribute values in S with the least total encoding length among all sets of regular expressions which together match at least F|S| attribute values in S.

Figure 5:
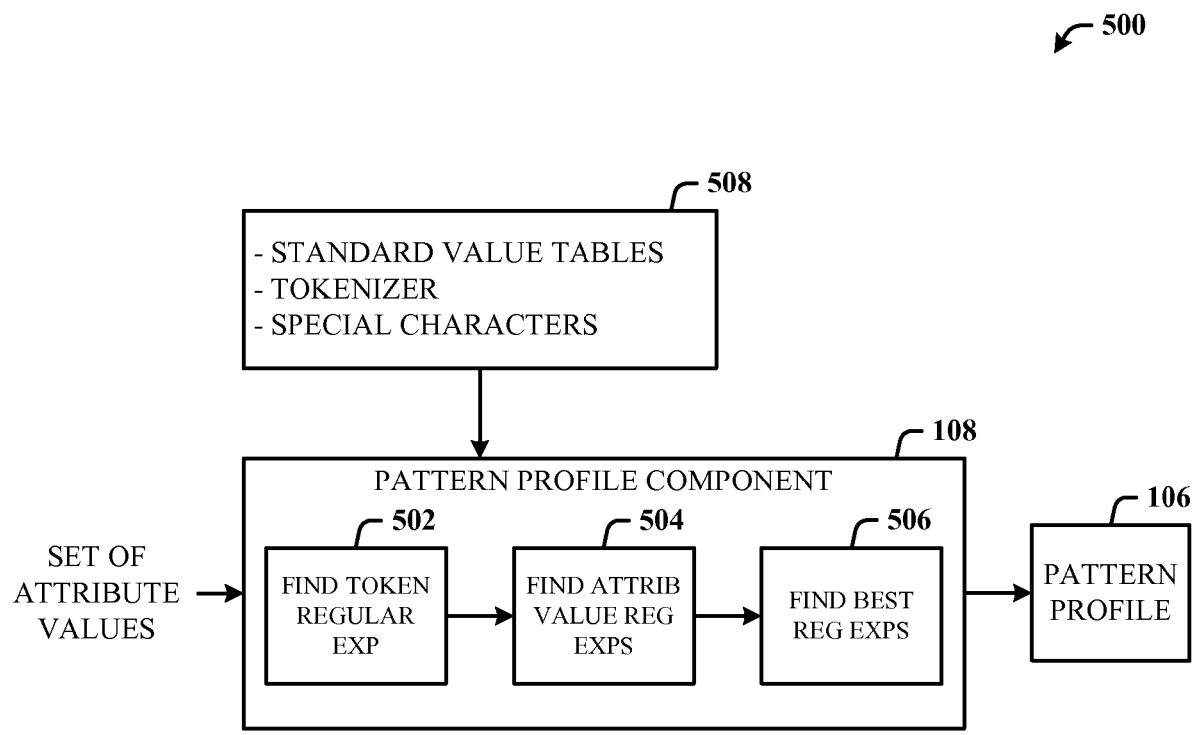
FIG. 5 illustrates a pattern profiling system.

FIG. 5 illustrates a pattern profiling system 500. The system includes the pattern profile component 108 for generating the pattern profile 106 based on the input set of attribute values (e.g., phone numbers). Internally, the pattern profile component 108 can include threes phases for generating the pattern profile 106. A first phase 502 finds the token regular expressions, followed by a second phase 504 of finding attribute value regular expressions, and then a third phase 506 of finding the best regular expressions. The component 108 also receives a second set of inputs 508 that include standard value tables, tokenizer values and special characters. The purpose of these will be described in greater detail below.

Figure 6:
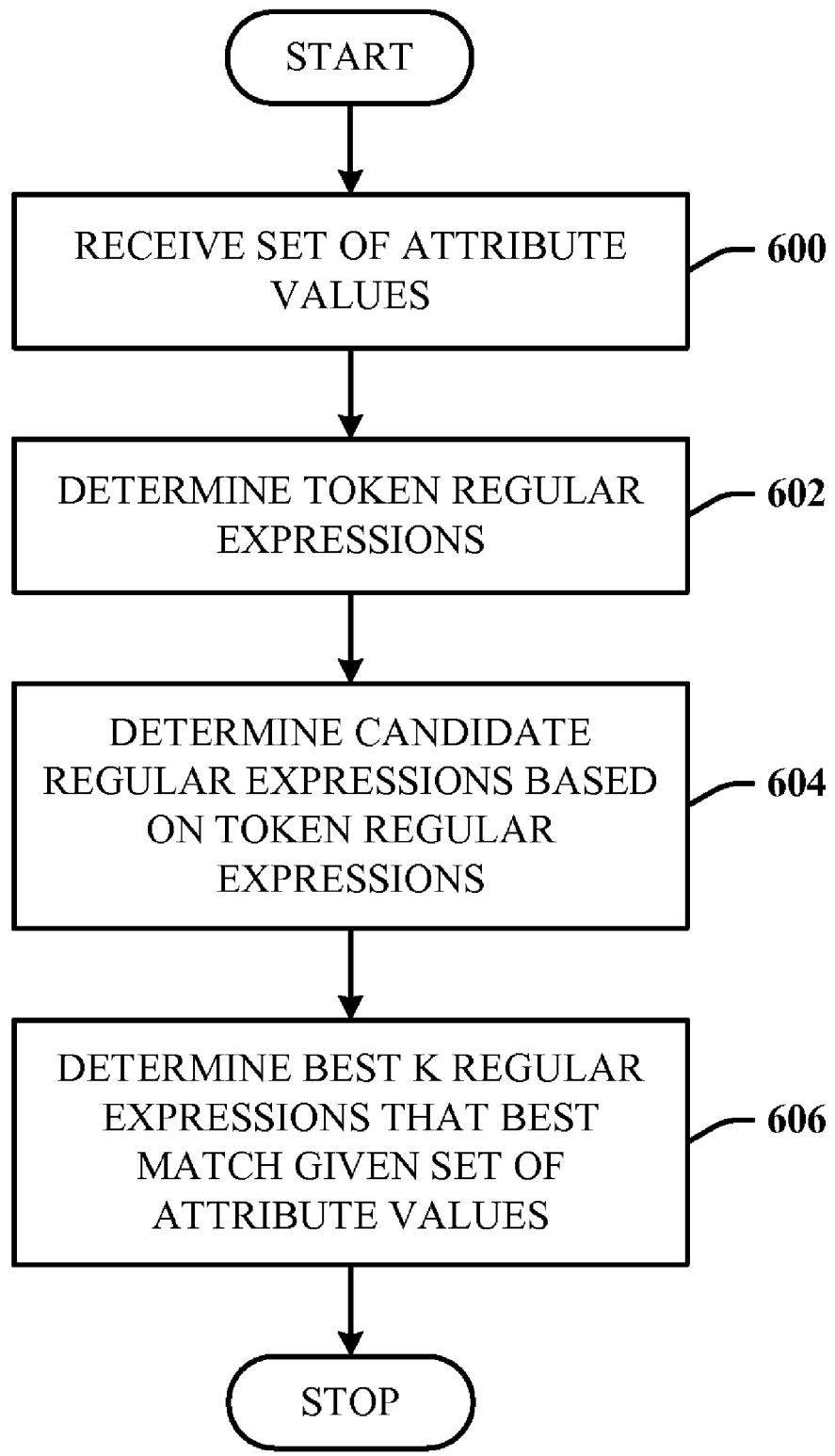
FIG. 6 illustrates a method of computing a pattern profile in accordance with the disclosed architecture.

FIG. 6 illustrates a method of computing a pattern profile in accordance with the disclosed architecture. At 600, a set of attribute values is received. In the first phase, candidate regular expressions are determined for matching tokens in attribute values, as indicated at 602. These candidate expressions are referred to as token regular expressions. In the second phase, candidate regular expressions are determined that are built upon the token regular expressions, for matching attribute values, as indicated at 604. In the third phase, K regular expressions are identified that best match the given set of attribute values, as indicated at 606. This phased approach allows the efficient incorporation of standard value tables as additional candidate token classes.

More specifically, a goal of the first phase (the token regular expressions) is to determine candidate regular expressions, which can match a "significant percentage" of tokens in the given set of attribute values. In order to form regular expression candidates, a character class hierarchy can be utilized.

Figure 7:
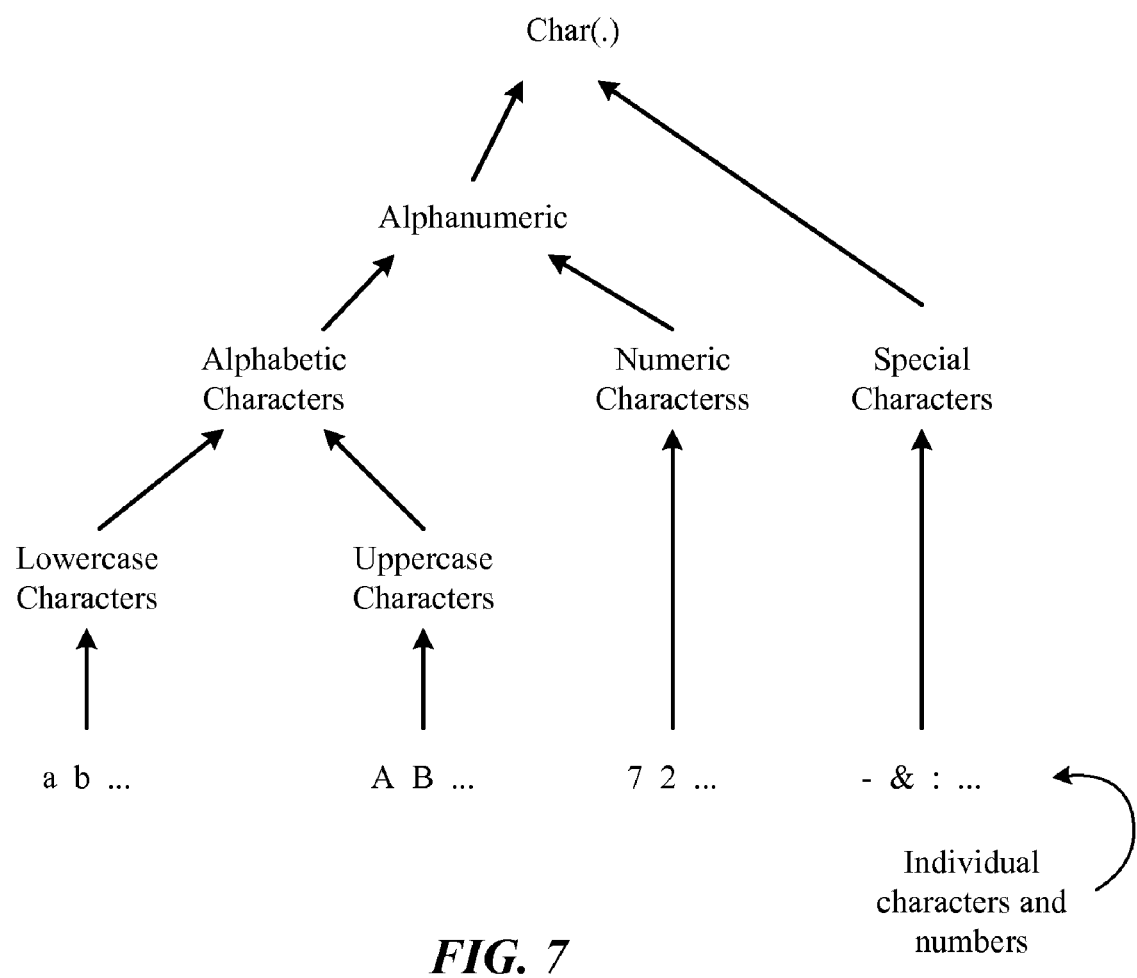
FIG. 7 illustrates a character class hierarchy for forming regular expression candidates.

FIG. 7 illustrates a character class hierarchy 700 for forming regular expression candidates. Note that each token can be accepted by a generic regular expression such as ".*", and perhaps other very general regular expressions. A goal is to identify more specific regular expressions that better characterize the target attribute (e.g., phone number).

At the bottom level of the hierarchy 700 are the classes of individual characters, which individual characters include uppercase and lowercase alphabetic characters, number characters, and special characters (or symbols) which can be default and user-provided. The second level up from the bottom level groups the alphabetic characters into an alphabetic lowercase character class and an alphabetic uppercase character class. A third level includes the general classes of alphabetic characters (uppercase and lowercase letters), numeric characters, and special characters. The fourth level is the class of alphanumeric characters which includes both the classes of alphabetic characters and numeric characters. The most general character symbol "." is at the top of the hierarchy 700.

An example regular expression formed from the hierarchy 700 could be aa(UpperCase)+(Digit)+(SpecialSymbol){1}. Note that it is possible to extend the character class hierarchy 700 to include Unicode characters and the corresponding classes.

Following are notations that will be used to describe the pattern profiling algorithm.

tokens(S): Let v be an attribute value in the input set S, and let tok be the tokenizer. The token set tok(v) of v is the set of tokens obtained by tokenizing v. The token set tokens (S) of S is the multi-set of tokens obtained by tokenizing each attribute value v in S.

freq(r, tokens(S)): Let r be a regular expression. The token frequency freq(r, tokens(S)) is the number of tokens in tokens(S) that r matches.

st-freq(r, tokens(S), L): Let r be a regular expression r. The sub-token frequency t-freq(r, tokens(S), L) of r with respect to S is the number of length-L substrings of strings in tokens(S) that r matches.

A goal in the token regular expressions phase is to identify all candidate regular expressions whose token frequencies are greater than f|S|.

Observe that the set of possible regular expressions which can be formed from the above hierarchy 700 is large. Therefore, a naive strategy of first determining all possible candidate regular expressions and then counting the number of tokens the candidate expressions match is inefficient.

A challenge in identifying candidate token regular expressions is to count the frequency of a small number of promising candidate regular expressions. The disclosed architecture iteratively grows the promising regular expressions. If st-freq (r, tokens(S), L+1) is greater than f"S", then there exist "sub-regular expressions" r' of r such that st-freq(r', tokens(S), L) has to be greater than f|S|.

The pattern profiling algorithm employs an iterative bottom-up approach for identifying candidate token regular expressions. Generally, the method begins by identifying regular expressions which accept sub-strings of tokens of smaller lengths and then slowly building up regular expressions which accept longer sub-strings, and ultimately, complete tokens.

In each iteration L, all regular expressions which accept more than f|S| length-L sub-strings of elements in tokens(S) are identified. Candidate regular expressions are then generated that can match sub-strings of length L+1. For instance, consider two regular expressions ab and b(lowercase), both of which accept sub-strings of length two. From these, a candidate regular expression ab(lowercase) can be generated which can accept sub-strings of length three. During this process, regular expressions containing special characters such as + can also be created.

Whenever, a candidate regular expression has a sequence (c . . . c) of identical character classes of length greater than or equal to m, a user-controlled parameter, a regular expression c+ is also generated. The frequencies of all these candidate sub-strings are counted and candidate regular expressions which do not have the required frequency, f|S|, are pruned. This iteration continues until no new regular expressions can be generated. Finally, only regular expressions which match at least f|S| tokens in tokens(S) are retained. That is, only regular expressions whose frequencies freq(r, tokens(S)) are greater than f|S| are retained as interesting token regular expressions.

Based on the interesting token regular expressions, interesting attribute value regular expressions can now be identified.

freq(r, S): Let r be a regular expression. The frequency freq(r, S) is the number of attribute values in S that r matches.

sv-freq(r, S, L): Let r be a regular expression r. The sub-value frequency sv-freq(r, S, L) of r with respect to S is the number of length-L token sequences of attribute values in S that r matches.

With respect to a frequent attribute value regular expression problem, a goal in the token regular expressions phase is to identify all candidate regular expressions which match at least f|S| tokens in the attribute values belonging to S.

This algorithm is similar to the token regular expression algorithm. For example, first, one token regular expression $r_T$ is added for each standard value table T. Each attribute value in S is modeled as a sequence of tokens $t_1, \ldots, t_n$. Next, regular expressions are identified that match a significant fraction f of attribute values in S. The algorithm is an iterative bottom-up procedure generating regular expressions which accept longer sequences of tokens.

The algorithm beings by first computing sub-value frequencies of individual token regular expressions, including the newly introduced expressions corresponding to the standard value tables. All token regular expressions are pruned having sub-value frequencies that are less than f|S|. Candidate regular expressions are then generated that can match pairs of tokens (or standard values). The frequencies of the candidate expressions are counted and the low frequency candidates discarded. This process continues until no more candidate expressions can be generated. Again, during the candidate generation phase, regular expressions are created containing symbols such as '+'. Whenever a candidate regular expression has a sequence $(r_t \ldots r_t)$ of identical token regular expressions of length greater than or equal to m, a user-controlled parameter, a regular expression $r_t+$ is also generated. Finally, only attribute value regular expressions are retained which match at least f|S| attribute values.

In the phase for identifying the best regular expressions, there now exist a set of interesting attribute value regular expressions whose frequency is greater than f|S|. The MDL score is computed for each of these regular expressions. A goal is now is to choose regular expressions from among these candidate expressions such that together, these expressions match at least F|S| attribute values such that the total MDL score is the minimum.

A greedy algorithm can be applied to greedily choose the regular expression r with the highest benefit, the benefit defined by a ratio of the number of unmatched attribute values in S that r matches and the MDL score of r. At any given point, the candidate frequent regular expressions are resorted and then the expression one with the highest benefit is selected. The algorithm stops when F|S| attribute values have been matched by the current set of candidate regular expressions.

Among all possible choices of frequent regular expression sets, the greedy algorithm picks a set whose MDL score is no greater than e/(1−e) times the optimal set of regular expressions. A quality guarantee follows from the reduction to the set coverage problem.

The discovery of approximate functional dependencies (FDs), approximate value inclusions (VIs), and frequent values (FVs) can be very useful for data analysis and data exploration. It can be shown that if X is an FD or VI with a key strength greater than a threshold τ, or a FV with relative frequency greater than a threshold τ, then in a random sample of the table, if the sample size is larger than m, X is an FD or VI with strength at least τ'=(τ−ε), or a frequent value with relative frequency at least τ'=(τ−ε) with high probability (1−δ), where ε and δ are thresholds specified by the user and m is a constant dependent on τ, ε and δ using a formula $$(m \geq (3/\epsilon^2)*(1/(1-\tau))*\log(1/\delta)).$$

A corollary of the above is if a random sample of the table is taken, and Y is not a FD/VI/FV greater than τ' in the sample, then with high probability, Y is not a FD/VI/FV great than τ in the original table. The above observation leads to an efficient way to discover FD/VI/FV by probabilistic approximate bounding and verification, as listed in the following algorithm.

Algorithm Discover FD/VI/FV

Input: Table T, strength τ, error threshold ε, probability δ, column set size k

Figure 8:
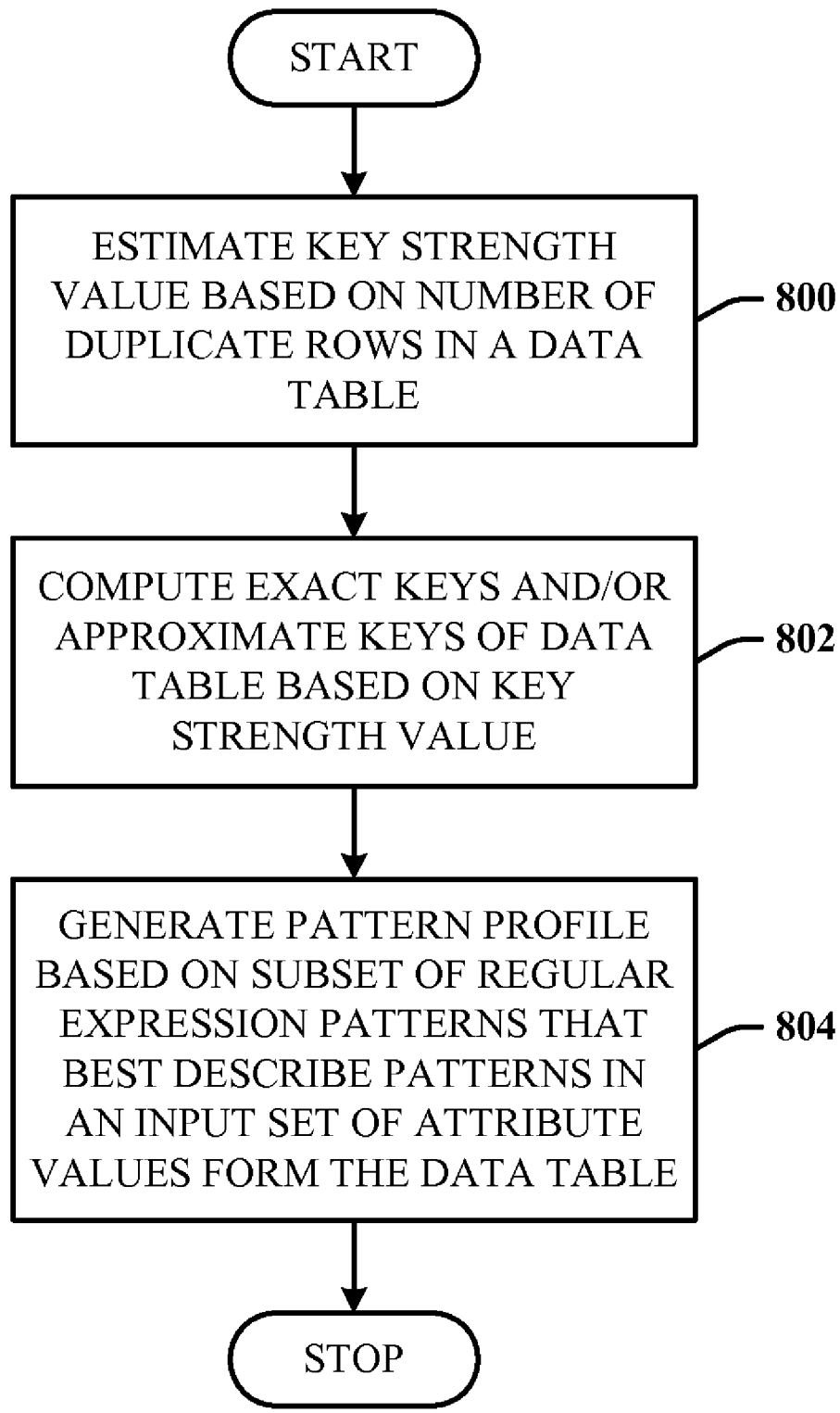
FIG. 8 illustrates an alternative method of computing a data profile.

1. Take a random sample from T with size of at least m
2. For each column set of size up to k
   a. compute the FD/VI/FV threshold in the sample,
   b. Throw out column sets that are below τ'=τ−ε
3. For each of the remaining column sets
   a. Compute the exact FD/VI/FV from T
4. Retain only column sets with threshold over τ
5. Return the column sets thus discovered FIG. 8 illustrates an alternative method of computing a data profile. At 800, a key strength value is estimated based on a number of duplicate rows in a data table. At 802, at least one of exact keys or approximate keys of the data table is computed based on the key strength value. At 804, a pattern profile is generated based on a subset of regular expression patterns that best describe patterns in an input set of attribute values from the data table.

Figure 9:
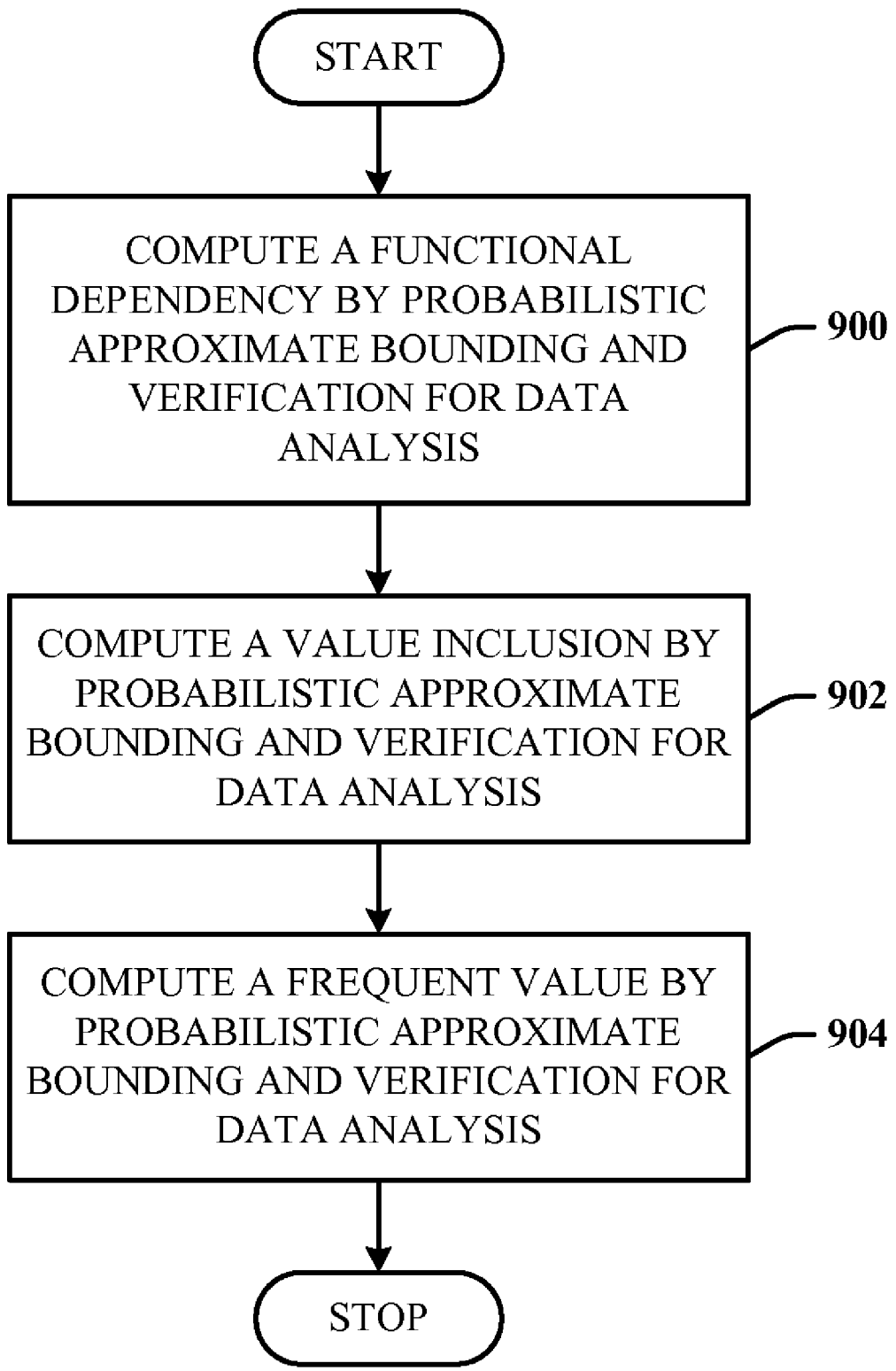
FIG. 9 illustrates a method of analyzing data as part of data profiling.

FIG. 9 illustrates a method of analyzing data as part of data profiling. At 900, a functional dependency is computed by probabilistic approximate bounding and verification. At 902, a value inclusion is computed by probabilistic approximate bounding and verification. At 904, a frequent value is computed by probabilistic approximate bounding and verification.

Figure 10:
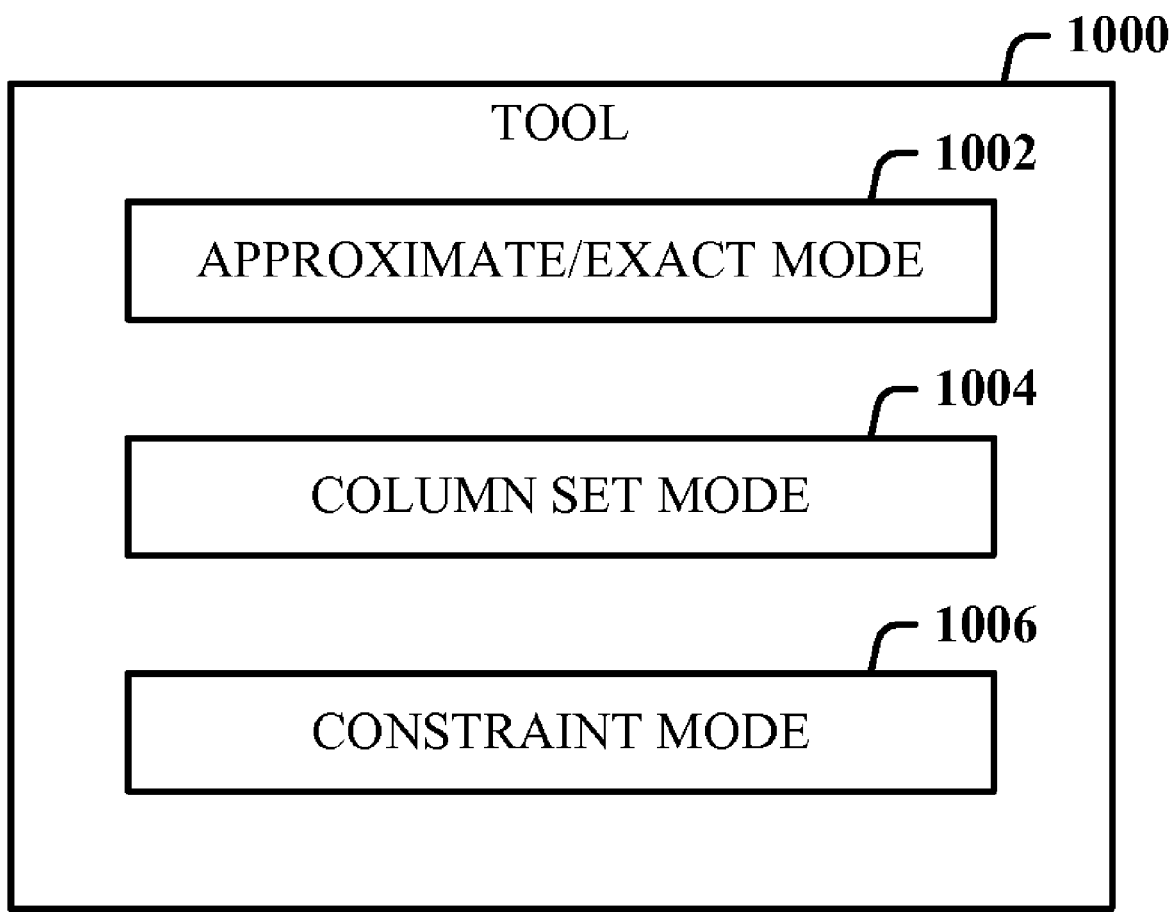
FIG. 10 illustrates a multi-dimensional tool.

The disclosed algorithms can be embodied as a tool that facilitates unification of data quality analysis and exploration. In support thereof, FIG. 10 illustrates a multi-dimensional tool 1000. The tool 1000 can provide three orthogonal dimensions for user to control an analysis/exploration experience. In other words, the user can specify an approximate/exact mode 1002 to trade off accuracy and speed. The user can also specify an explicit column set or a wildcard column set (e.g., any column set contains at most k columns) to profile via a column set mode 1004, and the user can also specify a constraint on the profile (e.g., a key strength value greater than 0.95 or relative frequency greater than 0.5) using a constraint mode 1006. In this way, the user can flexibly specify questions for analysis such as "what's the exact key strength for the combination of name and address", and questions for exploration such as "show all the column sets having a key strength is greater than 0.95 approximately, but quickly."

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
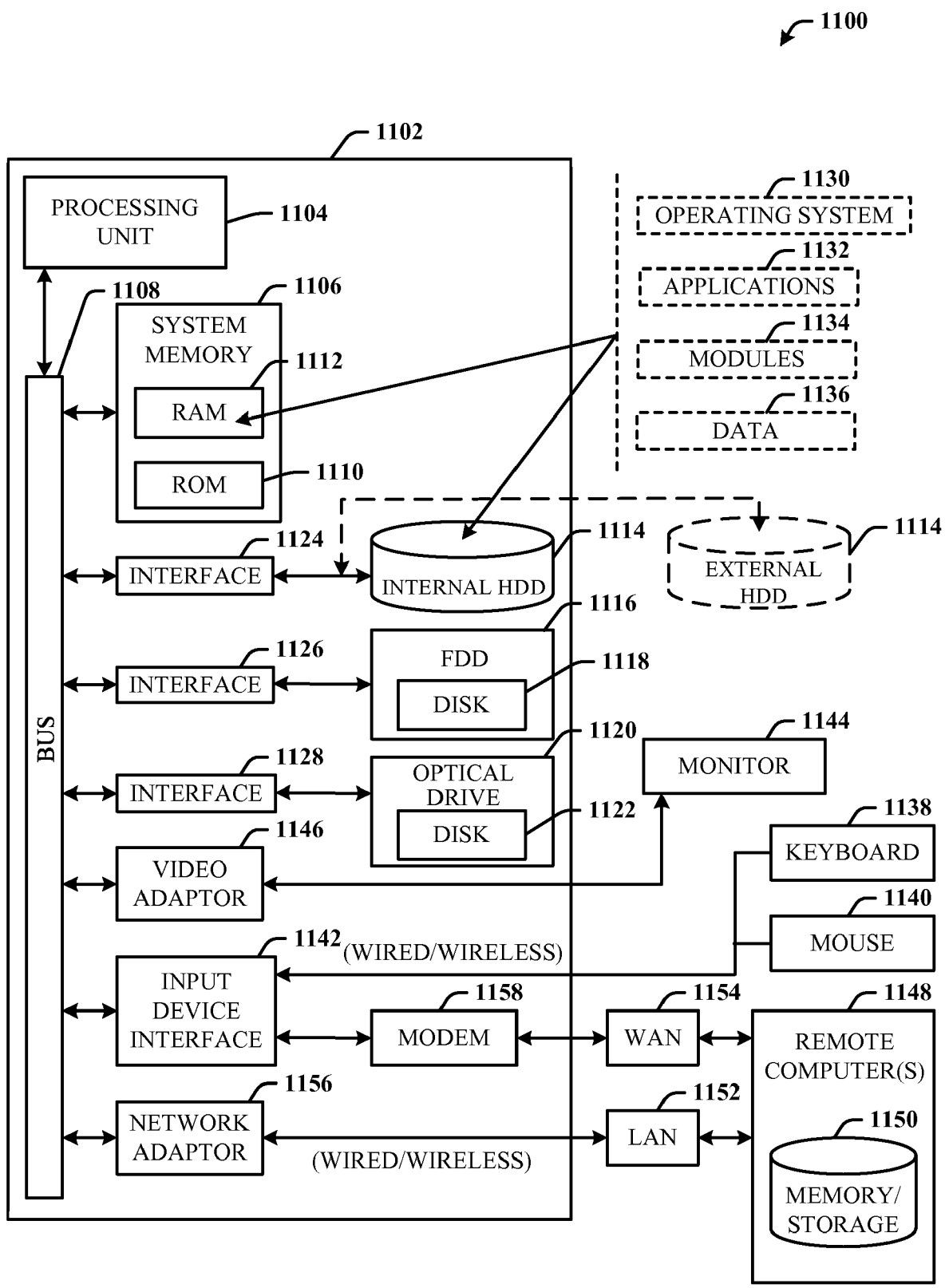
FIG. 11 illustrates a block diagram of a computing system operable to execute data profiling in accordance with the disclosed architecture.

Referring now to FIG. 11, there is illustrated a block diagram of a computing system 1100 operable to execute data profiling in accordance with the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102, the computer 1102 including a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1112, including an operating system 1130, one or more application programs 1132, other program modules 1134 and program data 1136. The one or more application programs 1132, other program modules 1134 and program data 1136 can include the key profile component 102, data table 104, pattern profile component 108, and data profile 106 of FIG. 1, the algorithms 502, 504 and 508, inputs 508 of FIG. 5, character hierarchy 700 of FIG. 7, and tool 1000 with modes of FIG. 10, for example.

All or portions of the operating system, applications, modules, and/or data can also be cached in the RAM 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wire and/or wireless communication network interface or adapter 1156. The adaptor 1156 may facilitate wire or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 12:
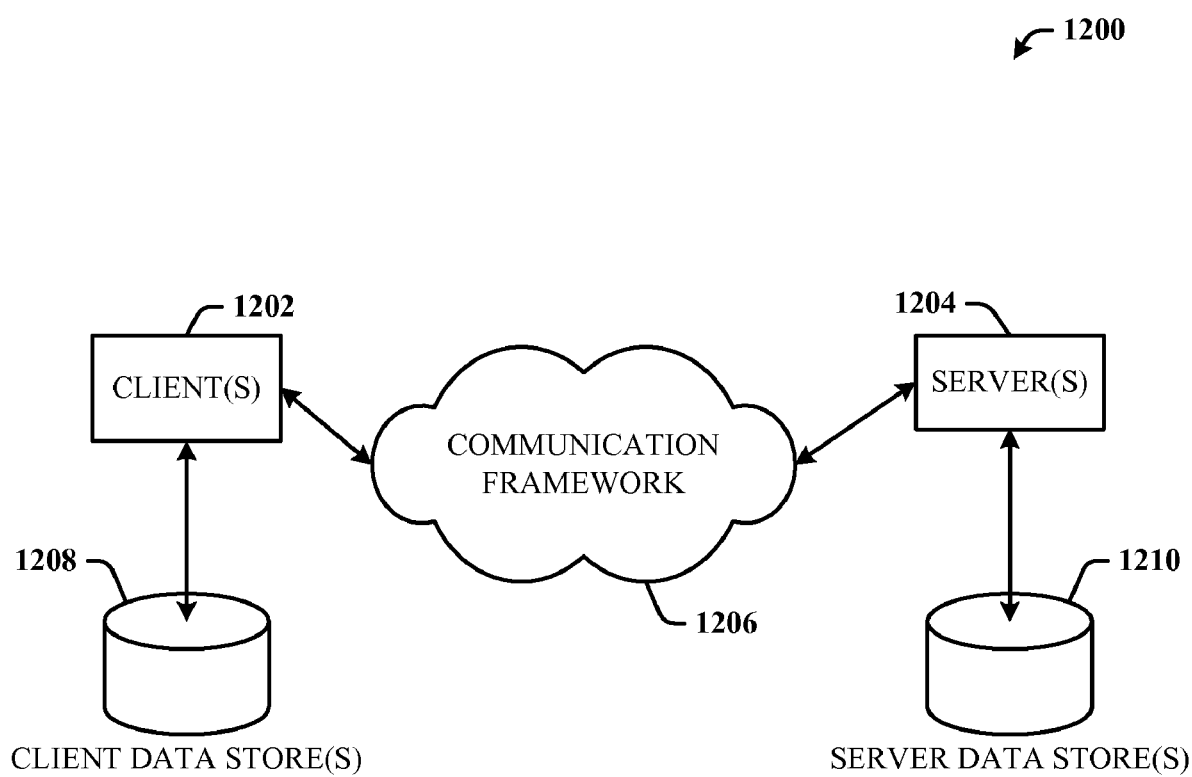
FIG. 12 illustrates a schematic block diagram of an exemplary computing environment for data profile computation in accordance with the disclosed architecture.

Referring now to FIG. 12, there is illustrated a schematic block diagram of an exemplary computing environment 1200 for data profile computation in accordance with the disclosed architecture. The system 1200 includes one or more client(s) 1202. The client(s) 1202 can be hardware and/or software (e.g., threads, processes, computing devices). The client(s) 1202 can house cookie(s) and/or associated contextual information, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

The client data stores 1208 and server data stores 1210 can be from which the data tables are obtained for data profiling in accordance with the disclosed architecture.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
   a key profile component configured to compute a key strength value of a data table based on a key of the data table, wherein the key of the data table comprises one or more columns of the data table, and wherein the key strength value is defined by a number of distinct values in the one or more columns as a fraction of a number of rows in the data table; and
   a pattern profile component configured to identify regular expression patterns in the data table as part of a data profile.

2. The system of claim 1, wherein the key of the data table comprises an exact key of the data table.

3. The system of claim 1, wherein the key of the data table comprises an approximate key of the data table.

4. The system of claim 3, wherein the approximate key is identified based on the key strength value relative to a threshold value.

5. The system of claim 1, wherein the key profile component is configured to determine an upper bound of the key strength value based on a duplicate row count.

6. The system of claim 1, wherein the pattern profile component is configured to process a standard value table to identify the regular expression patterns.

7. The system of claim 1, wherein the pattern profile component is configured to find a candidate regular expression based on a match of tokens in a set of attribute values obtained from the data table.

8. The system of claim 1, wherein the pattern profile component is configured to iteratively identify a set of regular expressions that accept increasingly greater sub-strings of a token until a regular expression of the set of regular expressions that accepts the token is identified.

9. A computer-implemented method of computing a data profile, comprising:
- generating a token regular expression based on a set of attribute values;
- computing candidate regular expressions based on the token regular expression; and
- computing a matching regular expression of the candidate regular expressions that matches the set of attribute values.

10. The method of claim 9, further comprising employing a character class hierarchy of alphanumeric and special characters to form the candidate regular expressions.

11. The method of claim 9, further comprising iteratively growing the candidate regular expressions based on a frequency of sub-tokens in the token regular expression.

12. The method of claim 9, further comprising computing a minimum description length score for the matching regular expression.

13. The method of claim 9, further comprising computing a functional dependency by probabilistic approximate bounding and verification.

14. The method of claim 9, further comprising computing a value inclusion by probabilistic approximate bounding and verification.

15. The method of claim 9, further comprising computing a frequent value by probabilistic approximate bounding and verification.

16. A computer-implemented method of computing a data profile, comprising:
- estimating a key strength value based on a number of duplicate rows in a data table;
- computing at least one of exact keys of the data table or approximate keys of the data table based on the key strength value; and
- generating a pattern profile based on a subset of regular expression patterns that describe patterns in an input set of attribute values from the data table.

17. The method of claim 1 6, further comprising:
- selecting column sets having a predetermined number of columns from the data table;
- computing a percentage based on the key strength value; and
- retaining column sets having corresponding key strength values above the percentage.

18. The method of claim 17, further comprising computing an exact key strength value on the retained column sets that are exact keys.

19. The method of claim 16, further comprising processing character classes and standard value tables to generate the pattern profile.

20. The method of claim 16, further comprising selecting one of the subset of regular expressions as a selected regular expression based on a highest benefit ratio.

* * * * *

UNITED STATES PATENT AND TRADEMARK OFFICE
CERTIFICATE OF CORRECTION

| | | |
|---|---|---|
| PATENT NO. | : 7,720,883 B2 | Page 1 of 1 |
| APPLICATION NO. | : 11/769050 | |
| DATED | : May 18, 2010 | |
| INVENTOR(S) | : Zhimin Chen et al. | |

It is certified that error appears in the above-identified patent and that said Letters Patent is hereby corrected as shown below:

In column 14, line 15, in claim 17, delete "1 6" and insert -- 16 --, therefor.

Signed and Sealed this
Seventeenth Day of May, 2011

David J. Kappos
*Director of the United States Patent and Trademark Office*